UNITED STATES PATENT OFFICE.

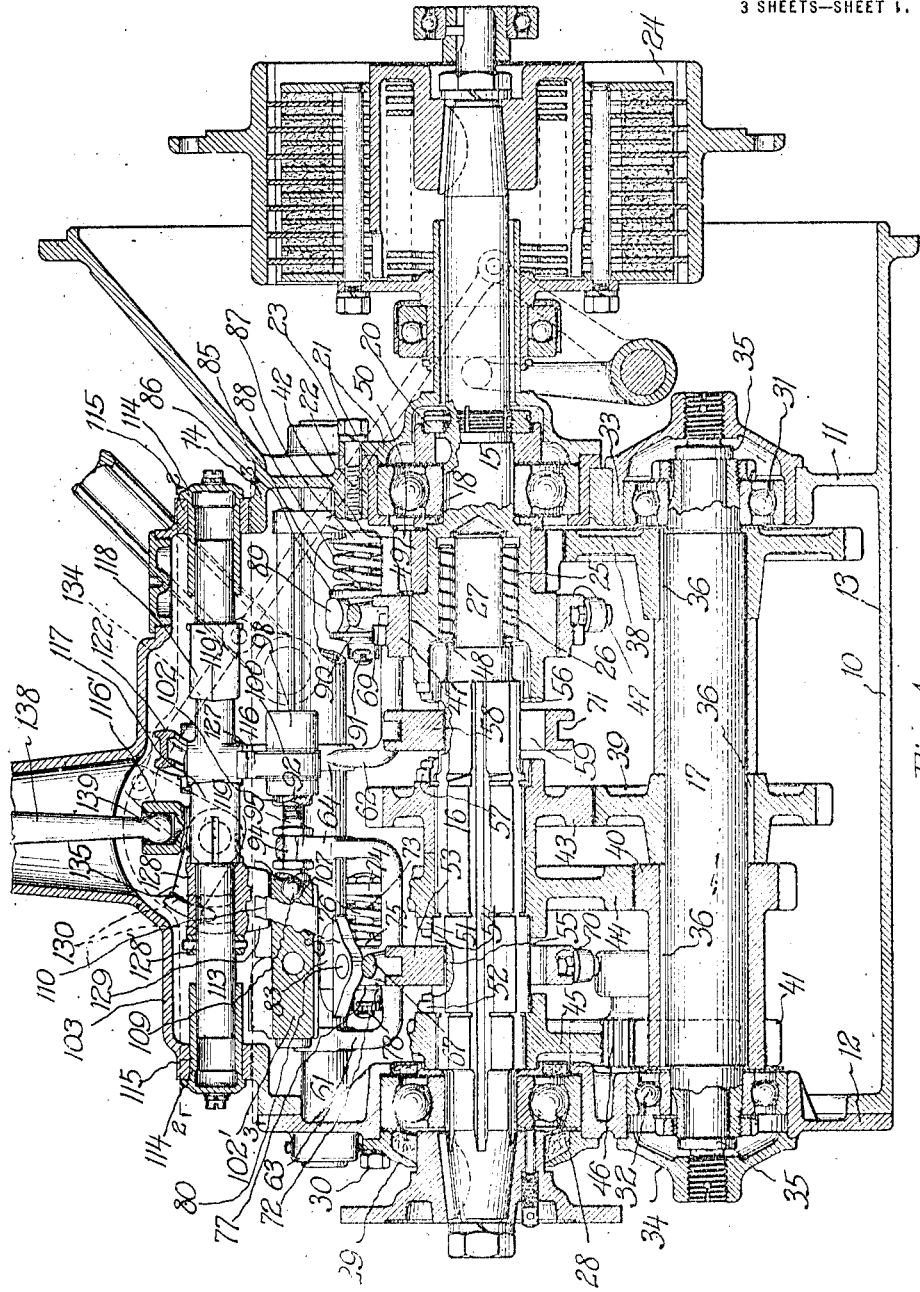

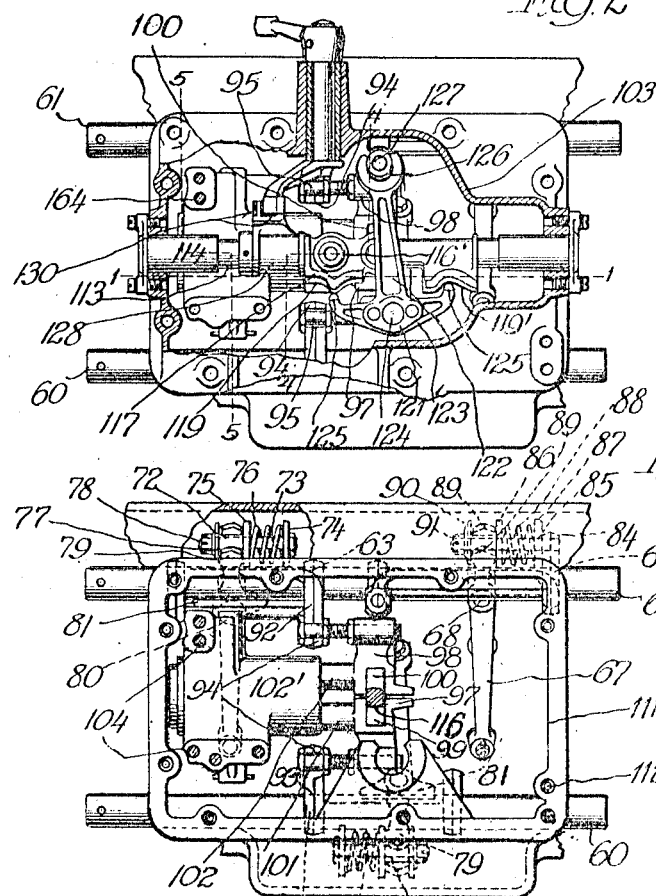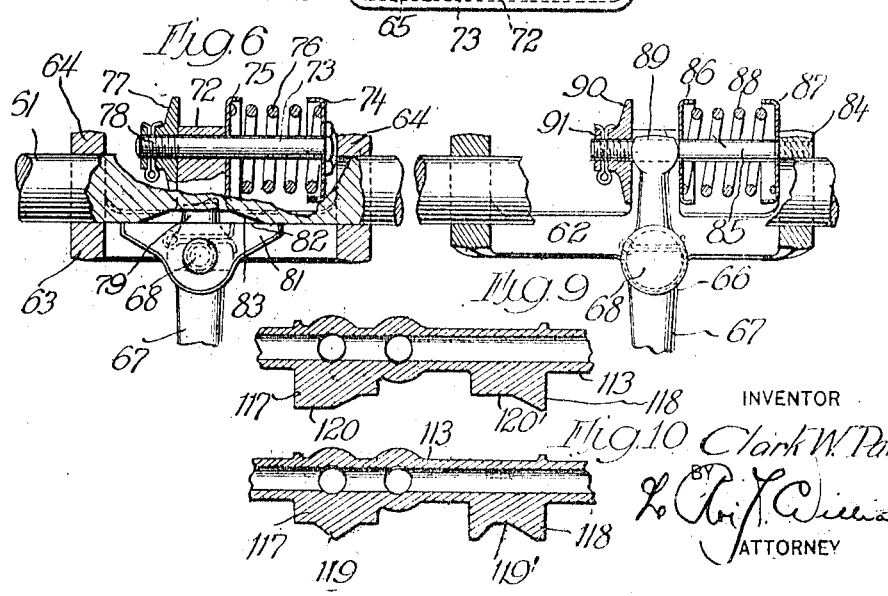

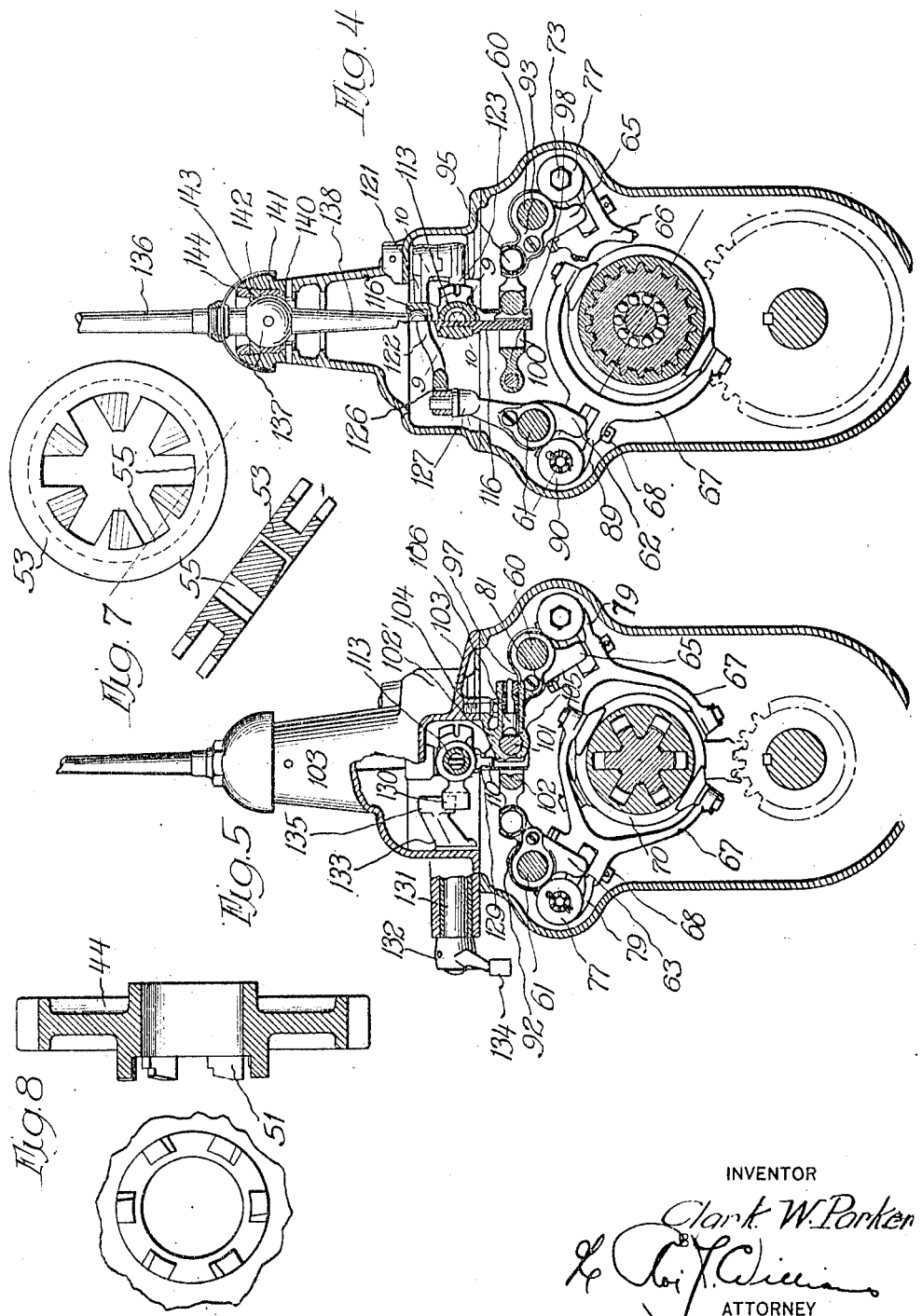

CLARK W. PARKER, OF DETROIT, MICHIGAN, ASSIGNOR TO CADILLAC MOTOR CAR COMPANY, OF DETROIT, MICHIGAN, A CORPORATION OF MICHIGAN.

TRANSMISSION MECHANISM.

1,270,318.  Specification of Letters Patent.  Patented June 25, 1918.

Application filed August 17, 1916.  Serial No. 115,551.

*To all whom it may concern:*

Be it known that I, CLARK W. PARKER, a citizen of the United States, and resident of Detroit, Wayne county, State of Michigan, have invented certain new and useful Improvements in Transmission Mechanisms, of which the following is a specification.

This invention relates to transmission mechanisms, and, more particularly, to means for controlling speed-change devices of transmissions as adapted for use in motor vehicles.

One of the salient objects of this invention is to provide a satisfactory and efficient change-speed mechanism, comprising a driving shaft, a driven shaft, and a countershaft, which is adapted to give a plurality of indirect drives and a direct drive without the shifting of gears; that is, all gears between the driving and driven shafts are in constant mesh, and satisfactory clutching devices are arranged between the respective gears and the shafts to be connected therewith.

Another salient object of this invention is to provide a change-speed gear-box, having alined driving and driven shafts and a parallel countershaft, with means for obtaining a plurality of indirect drives between the driving and driven shafts and also a direct drive therebetween, the means for obtaining the various drives permitting the driven shaft to run faster than or ahead of the driving shaft when these shafts are connected together for driving the driven shaft from the other. With my improved arrangement, the clutching devices may be actuated for bringing them into operative relation for connecting the driving and driven shafts without connecting these shafts until the driven member is revolving at a speed the same as or less than the speed of the driving member to be clutched thereto.

Another salient object is to provide satisfactory and efficient means for yieldingly connecting the means for actuating the shifting devices with the shifting devices which are adapted to operate speed-change members or clutches. In other words, an object of this invention is to provide means for yieldingly bringing into driving relation change-speed clutching devices or connections with or without means, as desired, for positively disengaging these parts.

Another salient object is to provide a gear-box having alined driving and driven shafts adapted to be connected indirectly through a countershaft and a plurality of gear-sets of different ratios, all of the gears being in constant mesh, with means for disconnecting the driving connections from all of said gears when the alined shafts are directly connected so that no gears in the box are being driven when there is a direct connection therethrough.

Another salient object is to provide, in a speed-change mechanism having a plurality of speed-change devices which are adapted to be selectively operated, another speed-change device which is adapted to be operated with either of said other speed-change devices.

Another salient object is to provide a novel and improved interlocking device which prevents the shifting of the change-speed mechanism when it is connected in driving relation with a prime mover, such as a motor.

These and other objects will appear from the following description, taken in connection with the illustrative drawings which form a part of this specification, and in which:

Figure 1 is a longitudinal vertical sectional view of a preferred form of transmission mechanism equipped with a shifting device embodying my invention, substantially on the line 1—1 of Fig. 2;

Fig. 2 is a horizontal sectional view, with portions broken away, substantially on the line 2—2 of Fig. 1;

Fig. 3 is a horizontal sectional view substantially on the line 3—3 of Fig. 1;

Fig. 4 is a transverse sectional view substantially on the line 4—4 of Fig. 2;

Fig. 5 is a transverse sectional view substantially on the line 5—5 of Fig. 2;

Fig. 6 illustrates an assembly, with portions broken away, of a shifting fork carrier;

Figs. 7 and 8 are detail views of clutch members;

Fig. 9 is a longitudinal sectional view through the cam shaft substantially on the line 9—9 of Fig. 4; and Fig. 10 is a longitudinal sectional view through the cam shaft substantially on the line 10—10 of Fig. 4.

Referring to the drawings, 10 represents a transmission casing provided with end walls 11 and 12, and upper and lower walls 13 and 14.

Arranged in the casing 10 in a manner which will be described more fully hereinafter, are alined shafts 15 and 16 and a parallel countershaft 17. The driving shaft 15 is adapted to be connected to a prime mover—(not shown)—through the usual clutch mechanism which may be arranged at the forward end of the driving shaft as at 24. Arranged in a recess 25 formed in the rear end of the driving shaft 15 is an anti-friction bearing 26 in which may be mounted the forward contracted end 27 of the driven shaft 16. The rear end of this shaft has fitted thereon an anti-friction bearing 28 which is mounted in the detachable end wall 12 of the casing and secured in position by means of the cap 29 and bolts 30. The countershaft 17 is arranged below the alined shafts in suitable bearings 31 and 32. The bearing 31 is arranged in a cap 33 suitably secured to the front end wall 11; and the bearing 32 is suitably mounted in the rear end wall 12. Another cap member 34 is suitably secured to the rear end wall 12 over the rear end of the countershaft.

It will be noted that, adjustably mounted in the cap members 33 and 34, respectively, are buttons 35 for resisting any end thrust of the countershaft. The countershaft 17 may have, suitably secured thereto, as by keys 36, a plurality of gears, 38, 39, 40, and 41, respectively, of different diameters.

The alined shafts 15 and 16 have, loosely arranged thereon, a plurality of gears, 42, 43, and 44, adapted to constantly mesh with the gears 38, 39, and 40 on the countershaft. Another gear 45 may be loosely mounted on the driven shaft 16 and adapted to connect with the gear 41 on the countershaft, through an idler gear 46 suitably arranged in the casing.

A single clutch member 47 is secured against relative rotation on the driving shaft 15 through splines 48. This clutch member is provided with teeth 49 which are adapted to be connected with the teeth 50 on the gear 42 by sliding the clutch member 47 forwardly on its splines 48.

The gears 44 and 45 on the driven shaft 16 are provided, on their adjacent sides, with beveled or backed-off-faced teeth 51 and 52, respectively. Intermediate the oppositely disposed teeth 51 and 52 is a double clutch member 53. This clutch member, while secured against rotation by splines 54 on the shaft 16, may be shifted axially thereon. This clutch member is provided with notches 55 which are adapted to be connected with either of the complementary clutch members 51 and 52 by a forward or rearward movement of the clutch member 53, thereby connecting either of these gears with the driven shaft 16.

The rear end of the driving shaft 15 and the forward end of the gear 43 on the driven shaft 16 are provided with backed-off or beveled-faced clutch teeth 56 and 57, respectively. Arranged on the shaft 16, intermediate the teeth 56 and 57, is another double clutch member 58 which is secured to the shaft 16 in the same manner as the clutch member 53 is secured thereto. The clutch member 58 is also formed with notches 59 which are adapted to be connected with either of the complementary clutch members 56 and 57 by a forward or rearward movement, respectively, of the clutch member.

Suitably mounted in the opposite end walls 11 and 12 of the casing, and fixed against movement therein, are a pair of supporting shafts 60 and 61. A pair of carriers 62 and 63, having bosses 64 are slidably arranged on the shaft 61. A similar carrier 65 is slidably mounted on the shaft 60. Shifting forks 66, having bifurcated arms 67, are pivotally mounted as at 68 on each of the carriers, 62, 63, and 65, respectively. The bifurcated arms of the shifting fork which is mounted on the carrier 62 are adapted to be arranged in the collar 69 of the clutch member 47 for shifting same. The arms 67 of the fork 66 which is mounted on the carrier 63 are adapted to be similarly arranged in the collar 70 of the double clutch member 53, for a similar purpose. The arms 67 of the shifting fork 66 which is mounted on the carrier 65 are adapted to be arranged in the collar 71 of the double clutch member 58. Each of the carriers 63 and 65 is provided with another boss 72.

A bolt 73, having a pair of plates 74 and 75 held apart by a spring 76, is adapted to have one of its ends mounted in the boss 72 and secured in position by another plate 77 which is threaded thereon as at 78.

Each of the shifting forks 66 on the carriers 63 and 65 is provided at its upper end with another pair of arms 79 which are adapted to extend between the plates 75 and 77, which permit each shifting fork to swing about its pivot 68 a limited distance forwardly and rearwardly.

The forks 66 on the carriers 63 and 65 have also secured thereon, as by rivets 80, a cam plate 81, the inner face 82 of which is adapted to coöperate with depressions or grooves 83 formed in the shafts 60 and 61, respectively, for a purpose which will be described more fully hereinafter.

The carrier 62 is provided with a boss 84 in which may be threaded a stud-bolt 85. A pair of plates 86 and 87, which are adapted to be held apart by a spring 88, may then be arranged on the bolt.

The fork 66 which is mounted on the carrier 62, it will be noted, is also provided with another pair of bifurcated arms 89 adapted to be arranged between the plate 86 on the bolt 85 and another plate 90 which may be threaded as at 91 on the bolt.

Each of the carriers 63 and 65 is provided with integral upwardly extending arms 92 and 93, respectively, having slotted bosses 94 in which may be arranged bolts 95. Threaded on these arms 92 and 93 are shifting heads 97 and 98. These heads are provided with slotted or notched portions 99 and 100. Each of the heads 97 and 98 is also provided with a cylindrical portion or guide-rod 101 and 102, respectively, mounted in a lock casing 102' secured to a pedestal support 103 as by bolts 104. The cylindrical portions 101 and 102 of the heads 97 and 98 are provided with slots 105 in which a spring-pressed plunger 106 for a yielding lock may rest, and slots 107 for a positive lock 108 in which a ball member 109 forming an interlock may rest.

The lock casing 102' is provided in its upper portion with a longitudinally extending groove 110 for a purpose which will be described more fully hereinafter.

The pedestal support and cover member 103, which is adapted to cover the opening 111 in the upper wall 14 of the casing 10, is adapted to be secured in position as by bolts 112.

A cam shaft 113 may be slidably arranged in oppositely disposed bearing members 114, mounted in bosses 115 in the cover member 103. The cam shaft 113 may have formed thereon or secured thereto a socket portion 116' and a downwardly extending shifting and selecting finger 116.

Also secured to the shaft 113 or formed integral therewith are cams 117 and 118 having a plurality of sets of cam contours 119—119' and 120—120', respectively. A cam follower 121, having a main arm 122 and transverse arms 123, may be pivotally mounted as at 124 in the cover member 103. The opposite ends 125 of the transverse arms 123 of the cam follower 121 may be actuated by the cams 117 and 118 as will be described more fully hereinafter.

The main arm 122 of the cam follower 121 is bifurcated at 126 to embrace the upwardly extending arm 127 of the carrier 62 for actuating the same.

Sleeved on the cam shaft 113 is a locking member 128, having a depending lug 129 slidably guided by groove 110 formed in casing 102'. The locking member 128 is provided with a lateral groove 130, and is maintained against axial movement on the shaft 113 between the cam 117 and the pin 128'.

A shaft 131 having arms 132 and 133, respectively, may be mounted in the cover member 103. The arm 132 is adapted to be connected through linkage 134 with the actuating mechanism for the clutch 24 between the driving shaft 15 and the motor (not shown). The other arm 133 is provided with a shoe 135 which is adapted to be located in the groove 130 of the locking member 128 when the clutch member 24 is in engaged position, thus preventing an axial shifting movement of the cam shaft 113 when the clutch 24 connects the driving shaft 15 with its prime mover.

A shifting lever 136 comprises a ball member 137 from which an arm 138 and a ball member 139 extend.

The pedestal member 103 has an inwardly extending flange 140 in which may be mounted semi-spherical socket member 141 serving as a support for the ball member 137; a felt washer 142 having a spherical surface 143 and a nut 144 threaded in position in the pedestal member 103 serves to hold the lever in position while permitting the arm 138 to be swung in all directions.

Having described the general construction, arrangement, and disposition of parts, it is believed that its operation will be understood as follows:

Assuming all of the parts to be in positions illustrated in the drawings, the clutch between the motor (not shown) and the driving shaft will be disengaged. The lower end 138 of the shifting lever will be tilted laterally to the right, revolving the cam shaft 113 in a clockwise direction, looking forwardly thereof, thereby moving the selecting and shifting finger 116 to the left into the slotted portion 100 of the shifting head 98. With the shifting lever thus tilted, the lower end may be moved forwardly, also sliding the carrier 63, its shifting fork 66, and the double clutch member 53 to which it is connected, in the same direction.

If the teeth 51 on the low-speed gear 44 are not in absolute alinement for engagement with the teeth 55 in the clutch member 53, the resistance encountered between shifting fork 66 and its carrier 63 will cause a compression of the spring 76 and a swinging movement of the fork on its pivot 68. However, when conditions are proper for a full meshing of the teeth 51 and 55, expansion of the spring 76 will cause the shifting fork to return to a substantially vertical position.

When the lower end 138 of the lever is tilted to the right for selecting the low-speed clutching device, the cam contour 119—119' is presented to the ends 125 of the cam follower 121. In neutral position, with the cam so turned, the rear end 125 of the cam follower will abut against the highest point of the cam contour 119, and the forward end 125 of the cam follower will be located in the lowest part of the cam contour 119'. Therefore, as the cam shaft 113, with its actuating finger 116, is shifted forwardly, the forward end of the cam follower will be moved outwardly by the rising surface of the cam 118, and the rear end of the cam follower will move inwardly on the receding surface of the cam 117, thereby causing a rocking movement of the cam follower about its pivot 124 and a forward movement of the carrier 62 and the clutch member 47 connected therewith, thus connecting the driving shaft 15 with the gear 42 loosely mounted thereon. With this arrangement of clutches, a drive is given from the shaft 15 through the gears 42, 38, 40, and 44, to the driven shaft 16. After the parts are thus shifted, the main clutch connecting the motor with the driving shaft may be engaged.

If it is now desired to go into intermediate speed, the main clutch will be disengaged and the lower end 138 of the shifting lever may then be moved rearwardly to its original position.

It will be noted that as the carrier 63 is shifted forward the rear portion of the face 82 of the cam 81 secured to the upper part of the shifting fork 66 will descend into the depression or groove 83 formed in the stationary shaft 61 on which the carrier 63 is mounted. Therefore, when the carrier 63 is shifted rearwardly for disengaging the clutch member 53 from the teeth 51 the rear end of the cam face 82 is caused to move outwardly, if it happens to be tilted, until it is in a substantially vertical position, thus insuring the positive withdrawal of the clutch from the engaging position while permitting of a yielding engagement of the clutch and its complementary parts.

Of course it will be understood that as the clutching element 53 is brought back to neutral the clutching member 47 is also brought back into neutral by an action of the cams 117 and 118, which is the reverse of that described.

The lower end 138 of the lever may now be tilted to the left, causing an oscillation of the cam shaft 113 and a tilting of the selecting finger 116 to the right into the slotted portion 99 of the shifting head 97. The cam shaft 113 may then be shifted rearwardly, causing the carrier 65, its shifting fork 66, and its connected clutch member 58 to move in the same direction until the teeth 57 are struck by the teeth 59 in the clutch member.

It will be understood that as the finger 116 is rocked to the right the cam contour 120—120' is presented for actuating the cam follower 121. With such a rocking movement, before the cam shaft 113 is shifted rearwardly the rear end 125 of the cam follower will be adjacent the point where the outer straight surface of the cam 117 meets the receding portion of the cam, and the forward end 125 of the cam follower will be adjacent a point where the straight surface of the cam 118 meets the rising portion of the cam. Therefore, as cam shaft 113 is moved rearwardly the cams 117 and 118 will cause the forward end 125 of the cam follower to ride outwardly on the cam contour 120' and the rearward end 125 to ride inwardly on the cam contour 120. This will cause a forward rocking movement of the main arm 122 of the cam follower, to shift the carrier 62 and the clutch member 47 to again engage with the gear 42.

If, as the clutch element 58 is brought against the complementary teeth 57 on the gear 43, the shaft 16 on which the element is mounted is revolving at a greater speed than the gear 43, there will be no engagement of the teeth 57 with the teeth 59 until the shaft 16 decreases in speed to or below that of the gear 43, the reason being that the beveled teeth 57 are so backed-off that they will slide by the teeth 59 in the clutch member in one direction. This, of course, will cause a compression of the spring 76 on the carrier 65, with the tilting of its shifting fork 66.

Of course, when the parts are in proper relation for clutching engagement, the expanding action of the spring with the shifting lever in a predetermined position will cause a yielding engagement of the clutch 58 and the gear 43.

It is also understood that as the carrier 62 shifts the clutch member 47 a yielding engagement is permitted and a positive disengagement is also provided.

The shifting carrier 65 is provided with means similar to that on the carrier 63, which gives a positive disengagement of the clutching member 58 in either direction.

With the clutch member 58 in driving connection with the gear 43, the drive through the transmission is from the driving shaft 15 through the gears 42, 38, 39, and 43 to the driven shaft 16.

If it is now desired to directly connect the driving and driven shafts, the cam shaft will be moved forwardly, bringing the clutch elements 58 and 47 into neutral position, and with the lower end 138 of the shifting lever still tilted toward the left the main clutch will be disengaged and the shifting lever moved forwardly, still carrying the carrier 65 and the clutching element 58 in the same direction. If the clutch teeth 56 on the driving shaft are not in proper relation to the teeth 59 on the clutch 58, there will be a compression of the spring 76 until the parts are in proper relation for engagement, when the spring will cause the parts to come together.

On the other hand, if the driven shaft and its clutch member 58 are going at a greater speed than the driving shaft 15 and its clutch member 56, the former shaft will overrun the latter shaft until the speeds are equal or until the driving shaft is going at a greater speed than the driven shaft, when there will be a yielding engagement connecting the driving and driven shafts directly.

It will be understood that when the cam shaft 113 is moved forwardly for directly driving the driven shaft, the cam follower 121 will not be rocked from its neutral position on account of the fact that the forward and rear ends thereof will ride on the parallel faces of the cam contour 120—120'.

It will be noted that with a direct drive between the driving and driven shafts there is no driving connection between either the driving or driven shaft and the countershaft; therefore the countershaft is idle on direct drive.

After shifting the cam shaft 113 rearwardly, disengaging the direct driving connection, a reverse drive may be obtained by tilting the lower end 138 of the shifting lever to the right, moving the selecting finger 116 to the left, as for low-speed connection, and moving the carrier 63 and its connected clutch member 53 rearwardly, thus connecting the teeth 52 on the gear 45 with the clutch member 53. Of course, if the clutch parts are not in ideal relation for a driving connection there will be yielding or overrunning engagement as described in connection with the engagement of the clutch member 53 with the teeth 51.

Of course it will be understood that the cam contour 119—119' will cause an engagement of the clutch member 47 with the gear 42.

With the reverse drive shift, the connection will be from the driving shaft 15 through the gears 42, 38, 41, 46, and 45.

It will be understood that the depending lug 129 formed on the locking member 128 will slide forwardly and rearwardly in the groove 110 formed in the lock casing 102', and is adapted to prevent rotation of the locking member 128, thereby maintaining its groove 130 in proper interlocking relation with the shoe 135 on the shaft 131, thereby preventing a shifting of the cam shaft 113 when the main clutch is in engaged position.

It will be noted that if, while the shaft 16 is revolving for forward speed, the double clutch member 53 is thrown rearwardly toward the gear 45 for connecting this gear to the shaft 16 for reverse, and the gear 45 is going in the opposite direction to the clutch member 53, the shifting mechanism for the clutch member 53, including its spring, will coöperate with the backed-off teeth 52 on the gear 45 to form an overrunning clutch mechanism until the parts are in proper relation for a reverse driving connection; also, if the double clutch member 53 is thrown for a forward speed, under the same circumstances, the clutch mechanism will operate similarly.

While I have described and illustrated what I believe to be a preferred embodiment of my invention, it will be understood by those skilled in the art that various modifications and changes may be made without departing from the spirit and scope hereof.

Having thus described my invention, what I claim and desire to secure by Letters Patent is:

1. In a transmission mechanism, the combination with alined driving and driven shafts, gears loosely mounted thereon, a countershaft, and a plurality of gears secured thereto and adapted to mesh with said other gears, of a double clutch member adapted to provide an overrunning connection between one of said alined shafts and either of a pair of gears thereon, another double clutch member for providing an overrunning clutch connection between the same shaft and another gear loosely mounted thereon, or for directly connecting the two alined shafts, resilient means for selectively operating said clutch connections, a single clutch member between one of said alined shafts and another of said gears thereon, and resilient means connecting said operating means with said single clutch member whereby the latter may be engaged with and disengaged from its complementary gear with an engaging or disengaging movement of either of said double clutch members.

2. In a transmission mechanism, the combination with alined driving and driven shafts, gears loosely mounted thereon, a countershaft, and a plurality of gears secured thereto and adapted to mesh with said other gears, of a double clutch member adapted to provide an overrunning connection between one of said alined shafts and either of a pair of said gears thereon, another double clutch member for providing an overrunning clutch connection between the same shaft and another gear thereon, or for directly connecting the alined shafts, resilient means for selectively operating said clutch connections, a single clutch member between one of said alined shafts and another of said gears, and means connecting said operating means with said single clutch member whereby the latter is adapted to be engaged and disengaged with a shift movement of either of said double clutch members.

3. In a transmission mechanism, the combination with alined shafts, and a parallel countershaft, of means connecting said shafts whereby a plurality of indirect drives and a direct drive may be obtained between said alined shafts, said means comprising a pair of clutch devices adapted to be selectively shifted, another clutch device, means for shifting said latter device with either of said former devices, resilient connections between said devices and said shifting means.

4. In a transmission mechanism, the combination with alined driving and driven shafts, and a parallel countershaft, of a loose gear mounted on one of said alined shafts, a plurality of loose gears loosely mounted on the other of said alined shafts, a pair of double clutch members secured against relative rotational movement on said latter shaft and adapted to be shifted longitudinally thereof, one of said clutch members being arranged between a pair of said gears and adapted to be selectively connected with either of them, the other of said double clutch members being arranged between a loose gear on one of said alined shafts and a complementary clutch member on the other of said alined shafts, and adapted to be selectively connected either to said latter-mentioned loose gear or to said complementary member, both of said clutch members and connections being provided with means which permits relative rotational movement in one direction between the driving and driven portions of the clutches while in operative position, and gears secured on said countershaft forming a plurality of connections of different ratios between said alined shafts.

5. In a transmission mechanism, the combination with alined driving and driven shafts, and a parallel countershaft, a loose gear mounted on one of said alined shafts, a plurality of loose gears loosely mounted on the other of said alined shafts, a pair of double clutch members secured against relative rotational movement on said latter shaft and adapted to be shifted longitudinally thereof, one of said clutch members being arranged between a pair of said gears and adapted to be selectively connected with either of them, the other of said double clutch members being arranged between one of said gears on one of said alined shafts and a complementary clutch member on the other of said alined shafts, and adapted to be selectively connected either to said latter-mentioned gears or to said complementary member, both of said clutch members and connections being provided with means which permits relative rotational movement in one direction between the driving and driven portions of the clutches while in operative position, gears secured on said countershaft forming a plurality of connections of different ratios between said alined shafts, and a third clutch member between said other alined shaft and said gear loosely arranged thereon.

6. In a transmission mechanism, the combination with alined driving and driven shafts, and a parallel countershaft, a loose gear mounted on one of said alined shafts, a plurality of loose gears loosely mounted on the other of said alined shafts, a pair of double clutch members secured against relative rotational movement on said latter shaft and adapted to be shifted longitudinally thereof, one of said clutch members being arranged between a pair of said loose gears and adapted to be selectively connected with either of them, the other of said double clutch members being arranged between one of said gears on one of said alined shafts and a complementary clutch member on the other of said alined shafts, and adapted to be selectively connected either to said latter-mentioned gear or to said complementary member, both of said clutch members and connections being provided with means which permits relative rotational movement in one direction between the driving and driven portions of the clutches while in operative position, gears secured on said countershaft forming a plurality of connections of different ratios between said alined shafts, a third clutch member between said other alined shaft and said gear loosely arranged thereon, means for shifting said clutch members into operative and inoperative position, and yielding connections between said shifting means and said latter-mentioned members.

7. In a transmission mechanism, the combination with a pair of shiftable double clutch members, and a single clutch member, of means for selectively shifting said double clutch members, and means for shifting said single clutch member with one movement of either of said other members.

8. In a transmission mechanism, the combination with a pair of shiftable double clutch members, and a single clutch member, of means for selectively shifting said double clutch members, means for shifting said single clutch member with one movement of either of said other members, and resilient connections between said shifting means and said clutch members.

9. In a transmission mechanism, the combination with a pair of shiftable double clutch members, a single clutch member, and means for selectively shifting said double clutch members, of means for shifting said single clutch member with one movement of either of said other members, and means connecting said shifting means and some of said clutch members whereby they are yieldingly brought into engaged position and positively brought into disengaged position.

10. In a transmission mechanism, the combination with a pair of shifting arms, a fork connected with each of said arms, and a shifting lever, of means whereby said lever may be connected with either of said arms by a lateral movement of the lever and will shift either of them by a forward and rearward movement of said lever, and a third fork having an arm arranged thereon, and connections between said latter-mentioned arm and said lever, whereby said latter-mentioned arm is shifted with one of said other arms.

11. In a transmission mechanism, the combination with a pair of shifting arms, a fork connected with each of said arms, and a shifting lever, of means whereby said lever may be connected with either of said arms by a lateral movement of the lever and will shift either of them by a forward and rearward movement of said lever, a third fork having an arm arranged thereon, and connections between said latter-mentioned arm and lever, whereby said latter-mentioned arm is shifted with either of said other arms.

12. In a transmission mechanism, the combination with alined driving and driven shafts, a parallel countershaft, of means for forming a plurality of indirect and direct connections between said alined shafts, comprising shiftable clutch members, a fork for one of said members, a shiftable carrier, said fork being pivotally mounted on said carrier, spring means for limiting the pivotal movement of said fork, said carrier having an arm, a rotatable and axially shiftable shaft provided with a finger adapted to be connected with said arm by a rotational movement of the shaft and to shift the carrier by an axial movement of the shaft, and means for rotating and axially shifting said shaft.

13. In a transmission mechanism, the combination with alined driving and driven shafts, and a parallel countershaft, of means for forming a plurality of indirect and direct connections between said alined shafts, comprising shiftable clutch members, forks for said members, shiftable carriers provided with arms, one of said forks being pivotally mounted on each of said carriers, resilient means for limiting the pivotal movement of said forks, a rotatable and axially movable shaft having a finger adapted to be selectively connected with each of said arms by a rotational movement of the shaft and to shift the arms by an axial movement thereof, and means for imparting a rotational and axial movement to said shaft.

14. In a transmission-mechanism, the combination with alined driving and driven shafts, and a parallel countershaft, of means for forming a plurality of indirect and direct connections between said alined shafts, comprising shiftable clutch members, forks for said members, shiftable carriers provided with arms, one of said forks being pivotally mounted on each of said carriers, resilient means for limiting the pivotal movement of said forks, a rotatable and axially movable shaft having a finger adapted to be selectively connected with each of said arms by a rotational movement of the shaft and to shift the arms by an axial movement thereof, a prime mover, a clutch adapted to connect and disconnect said mover and said driving shaft, means for operating said clutch, and an interlocking device between said latter-mentioned means and said axially movable shaft, for preventing an axial movement of said shaft when said clutch is engaged.

15. In a transmission mechanism, the combination with alined driving and driven shafts, and a parallel countershaft, of means for forming a plurality of indirect and direct connections between said alined shafts, comprising shiftable clutch members, forks for said members, shiftable carriers provided with arms, one of said forks being pivotally mounted on each of said carriers, resilient means for limiting the pivotal movement of said forks, a rotatable and axially movable shaft having a finger adapted to be selectively connected with each of said arms by a rotational movement of the shaft and to shift the arms by an axial movement thereof, means for imparting a rotational and axial movement to said shaft, another carrier provided with a pivotally mounted shifting fork, said latter-mentioned carrier having an arm, a pivotally mounted cam follower connected with said arm, said axially movable shaft being provided with a plurality of cam faces, said cam faces being brought into operative relation with said follower by different rotational movements of said shaft and to operate said follower by an axial movement of the shaft.

In testimony whereof I affix my signature.

CLARK W. PARKER.